United States Patent
Maruyama et al.

(10) Patent No.: US 7,551,395 B2
(45) Date of Patent: Jun. 23, 2009

(54) MAIN POLE STRUCTURE COUPLED WITH TRAILING GAP FOR PERPENDICULAR RECORDING

(75) Inventors: Yoji Maruyama, Saitama (JP); Kazue Kudo, Kanagawa (JP); Ichiro Ohdake, Kanagawa (JP); Tadayuki Iwakura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 417 days.

(21) Appl. No.: 11/492,378

(22) Filed: Jul. 24, 2006

(65) Prior Publication Data

US 2007/0019327 A1    Jan. 25, 2007

(30) Foreign Application Priority Data

Jul. 22, 2005    (JP)    ............................. 2005-212223

(51) Int. Cl.
*G11B 5/127*    (2006.01)
(52) U.S. Cl. ................................. 360/125.13
(58) Field of Classification Search ............ 360/125.13, 360/125.013, 125.14, 125.09, 125, 126
See application file for complete search history.

(56) References Cited

U.S. PATENT DOCUMENTS

| | | | | |
|---|---|---|---|---|
| 6,697,221 B2* | 2/2004 | Sato et al. | ............... | 360/125.13 |
| 6,809,899 B1* | 10/2004 | Chen et al. | ............. | 360/125.13 |
| 7,002,775 B2* | 2/2006 | Hsu et al. | ............. | 360/125.03 |
| 7,397,633 B2* | 7/2008 | Xue et al. | ................ | 360/125.3 |
| 7,433,151 B2* | 10/2008 | Sasaki et al. | ........... | 360/125.03 |
| 7,468,863 B2* | 12/2008 | Sasaki et al. | ........... | 360/125.09 |
| 2002/0080523 A1 | 6/2002 | Sato et al. | | |
| 2004/0032692 A1* | 2/2004 | Kobayashi | .................. | 360/126 |
| 2004/0212923 A1 | 10/2004 | Taguchi | | |
| 2004/0218312 A1 | 11/2004 | Matono | | |
| 2004/0228030 A1 | 11/2004 | Mochizuki et al. | | |
| 2004/0228031 A1 | 11/2004 | Takeo | | |
| 2004/0264048 A1 | 12/2004 | Matono et al. | | |
| 2005/0057852 A1 | 3/2005 | Yazawa et al. | | |
| 2005/0068665 A1 | 3/2005 | Le et al. | | |
| 2005/0068669 A1* | 3/2005 | Hsu et al. | .................... | 360/125 |
| 2006/0238917 A1* | 10/2006 | Sasaki et al. | ................ | 360/126 |

FOREIGN PATENT DOCUMENTS

| | | |
|---|---|---|
| JP | 2003-123210 | 4/2003 |
| JP | 2004-127480 | 4/2004 |
| JP | 2004-310968 | 11/2004 |

* cited by examiner

*Primary Examiner*—Tianjie Chen
(74) *Attorney, Agent, or Firm*—Townsend and Townsend and Crew LLP; Rambod Nader

(57) ABSTRACT

A magnetic head with a narrow track width angle and of excellent mass productivity is provided for attaining a large capacity magnetic disk drive. In an embodiment, a perpendicular recording magnetic head includes: a first non-magnetic film and a first soft magnetic film stacked on the trailing side of a main magnetic pole piece for constituting a gap film; a second non-magnetic layer in contact with the end face of the first non-magnetic layer on both sides of the main magnetic pole piece; a third soft magnetic film in contact with the second non-magnetic layer on both sides of the main magnetic pole piece; and a second soft magnetic film in contact with the first soft magnetic film and the third soft magnetic film on the trailing side of the main magnetic pole.

14 Claims, 14 Drawing Sheets

(a)

(b)

(a)

(b)

(c)

(a)

(b)

MAIN POLE STRUCTURE COUPLED WITH TRAILING GAP FOR PERPENDICULAR RECORDING

CROSS-REFERENCES TO RELATED APPLICATIONS

This application claims priority from Japanese Patent Application No. JP2005-212223, filed Jul. 22, 2005, the entire disclosure of which is incorporated herein by reference.

BACKGROUND OF THE INVENTION

The present invention relates to a magnetic head for a magnetic disk drive using a perpendicular magnetic recording system and, more particularly, it relates to a structure of a perpendicular recording magnetic head suitable for writing magnetic information at high density on a medium surface, as well as a manufacturing method thereof.

Storage devices for information equipment mainly use semiconductor memories and magnetic memories. Specifically, semiconductor memories are used for internal storage devices with a view point of access time, and magnetic disk drives are used for external storage devices with a view point of large capacity and nonvolatility. The storage capacity is an important index representing the performance of the magnetic disk drive. Large capacity and small size magnetic disk drives have been demanded in the market along with development of the information society in recent years. Recording systems suitable to the demand include a perpendicular recording system. Since the system can increase the density, it is highly probable to be predominant instead of the conventional in-plane recording system.

Patent Document 1 (JP-A No. 2004-310968) discloses a perpendicular recording magnetic head having a stabilized magnetization film with a soft magnetic characteristic on the lateral surface of a main magnetic pole piece in the direction of track width. Patent Document 2 (JP-A No. 2005-18851) discloses a perpendicular recording magnetic head that makes the magnetic field gradient abrupt by disposing a soft magnetic film on the trailing side of a main magnetic pole piece.

SUMMARY OF THE INVENTION

Since the direction of magnetization in the recording medium of the perpendicular recording system is perpendicular to the plane of the medium, the effect of demagnetizing fields between adjacent magnetic domains is small compared with that in the in-plane recording system. Accordingly, magnetic information can be recorded at high density in the medium, which makes it possible to configure a magnetic disk drive with large capacity. Patent Document 2 discloses means for making the magnetic field gradient abrupt on the trailing side of the main magnetic pole piece, and Patent Document 1 discloses means for providing narrow track recording by disposing a stabilized magnetic film with a soft magnetic characteristic on the lateral surface of the main magnetic pole piece in the track width direction.

It can be confirmed by computer simulation that an aimed high density recording is possible theoretically according to the techniques described above. However, it has been found that the non-magnetic gap disposed on the trailing side of the main magnetic pole piece has to be formed to have an extremely short length (40 to 60 nm) and a high degree of accuracy (within a range of ±10 nm). Further, it has also been found that a strong recording magnetic head from the main magnetic pole piece cannot be obtained if the distance between the soft magnetic film pattern disposed on both sides of the main magnetic pole piece and the main magnetic pole piece is equal to the gap on the trailing side and that the recording magnetic field is remarkably lowered if the length of the soft magnetic film (shield on the trailing side) in contact with the gap on the trailing side in the direction of the depth is long. Accordingly, it has been found that the accuracy of forming the members (film thickness, length in the direction of depth) has to be extremely high (in a range of ±10 nm) in order to attain an aimed abrupt magnetic field gradient. In a case of manufacturing perpendicular recording magnetic heads by current commercial semiconductor manufacturing apparatus, therefore, the production yield is low and inexpensive heads cannot be mass produced.

A feature of the present invention is to provide a perpendicular recording magnetic head with a narrow track width and of excellent mass productivity in order to provide a magnetic disk drive capable of high density recording.

The features of a typical perpendicular recording magnetic head of the invention are as described below. The magnetic head has an auxiliary magnetic pole piece, a main magnetic pole piece, coils turning around a magnetic circuit constituted with the auxiliary magnetic pole piece and the main magnetic pole piece, a first non-magnetic film and a soft magnetic film stacked on the trailing side of the main magnetic pole piece, and a second non-magnetic film formed on both sides of the main magnetic pole piece, the first non-magnetic film and the soft magnetic film.

According to the invention, a perpendicular recording magnetic head with a narrow track width and of excellent mass productivity can be provided.

BRIEF DESCRIPTION OF THE DRAWINGS

FIG. 16 is a graph showing the result of calculation for magnetic fields in a structure where a soft magnetic film is disposed above the main magnetic pole piece.

DETAILED DESCRIPTION OF THE INVENTION

Figure 3:
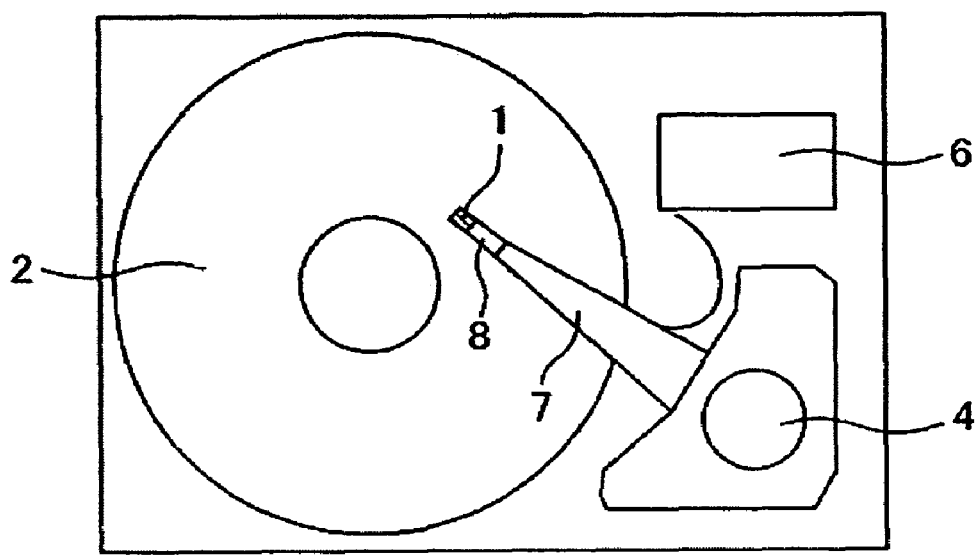
FIG. 3 includes a plan view and a cross-sectional view showing the schematic configuration of a magnetic disk drive using the magnetic head according to the invention.
Figure 3:
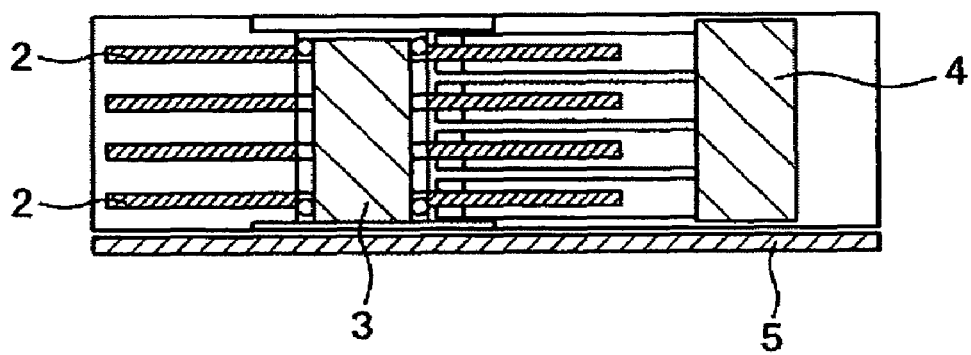

FIG. 3 shows a basic configuration of a magnetic disk drive using a perpendicular recording system. FIG. 3(a) is a plan view of the device and FIG. 3(b) is a cross-sectional view thereof. Magnetic disks 2 are directly coupled with a spindle motor 3 and rotated upon input and output of information. A perpendicular recording magnetic head (hereinafter referred to as the magnetic head) 1 is attached to a suspension 8 and supported by way of an arm 7 on a rotary actuator 4. The suspension 8 has a function of holding the magnetic head 1 relative to the magnetic disk 2 at a predetermined force. A circuit substrate 5 mounted with a read/write circuit 6 for processing read/write signals, a control circuit for controlling each of the components, etc. is attached to a drive main body. Read waveforms obtained by the perpendicular recording system (change of amplitude of read signals relative to the time axis) are in a trapezoidal wave unlike a Lorentz type waveform as seen in the in-plane recording system.

The perpendicular recording system uses a recording medium having an axis of easy magnetization in the direction perpendicular to the recording plane. A glass or Al substrate is used for the substrate. A thin magnetic film constituting a recording medium is formed on the substrate. Recording magnetic fields from the magnetic head 1 act on the recording medium of the magnetic disk 1 to reverse magnetization in the recording layer. In the perpendicular magnetic recording, in order to conduct recording by using the magnetic field component in the perpendicular direction, a soft magnetic underlayer (SUL) is disposed between the recording layer and the substrate.

To write magnetic information to the recording medium of the recording disk 2, a functional portion (writing functional portion) having an electromagnetic conversion effect of the magnetic head 1 is used. In addition, to read the magnetic information, a functional portion utilizing a magnetoresistive phenomenon, a giant magnetoresistive phenomenon, or an electromagnetic induction phenomenon (read functional portion) is used. The magnetic head 1 moves above a magnetic disk surface along with rotation of the rotary actuator 4 and, after being positioned at an optional place, writes or reads magnetic information.

The constitution of the magnetic head according to embodiments 1 to 5 of the present invention will be described specifically.

EMBODIMENT 1

Figure 1:
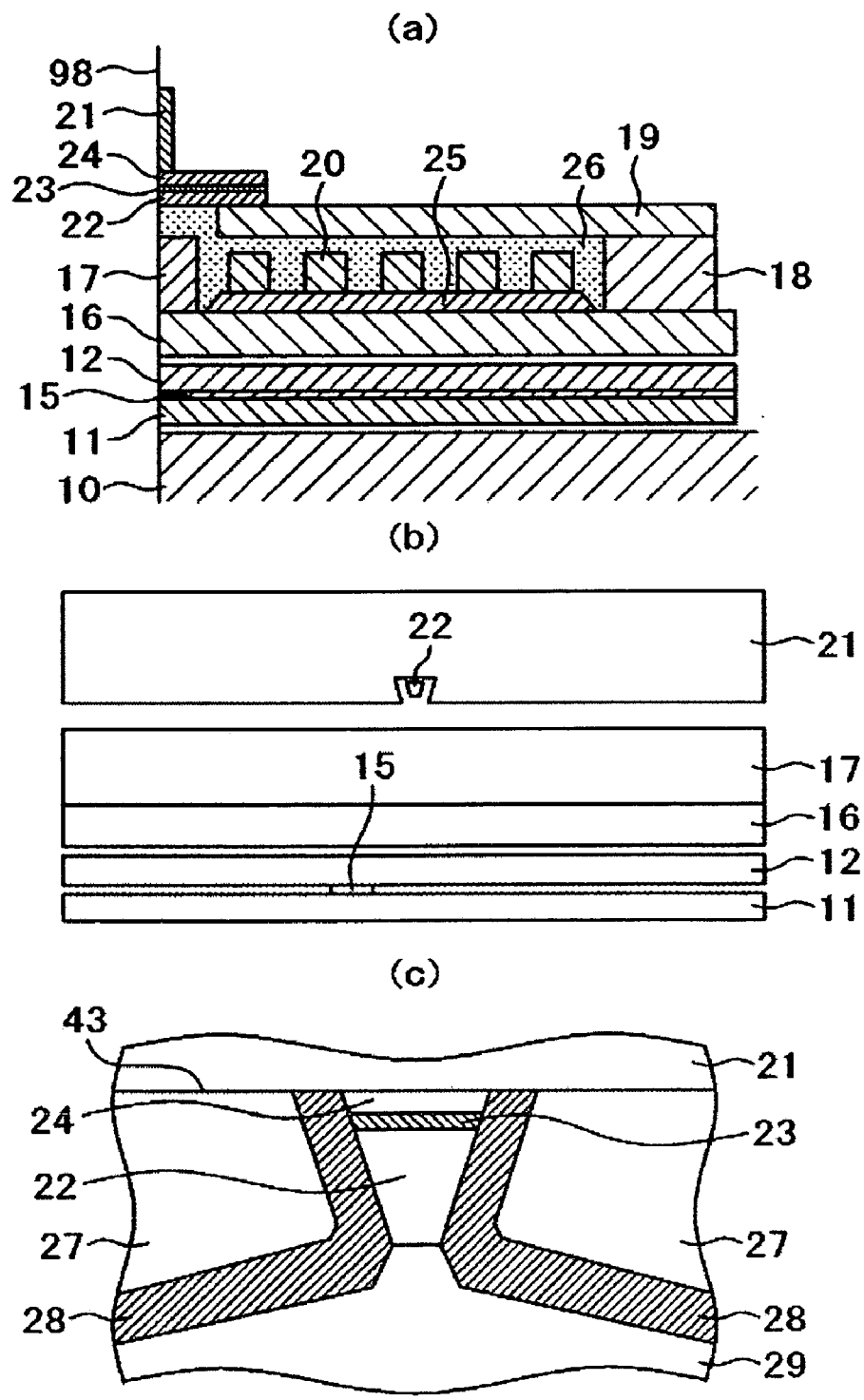
FIG. 1 includes a cross-sectional view of a magnetic head of embodiment 1, a side view as viewed from an air bearing surface, and an enlarged view of a writing functional portion.
Figure 2:
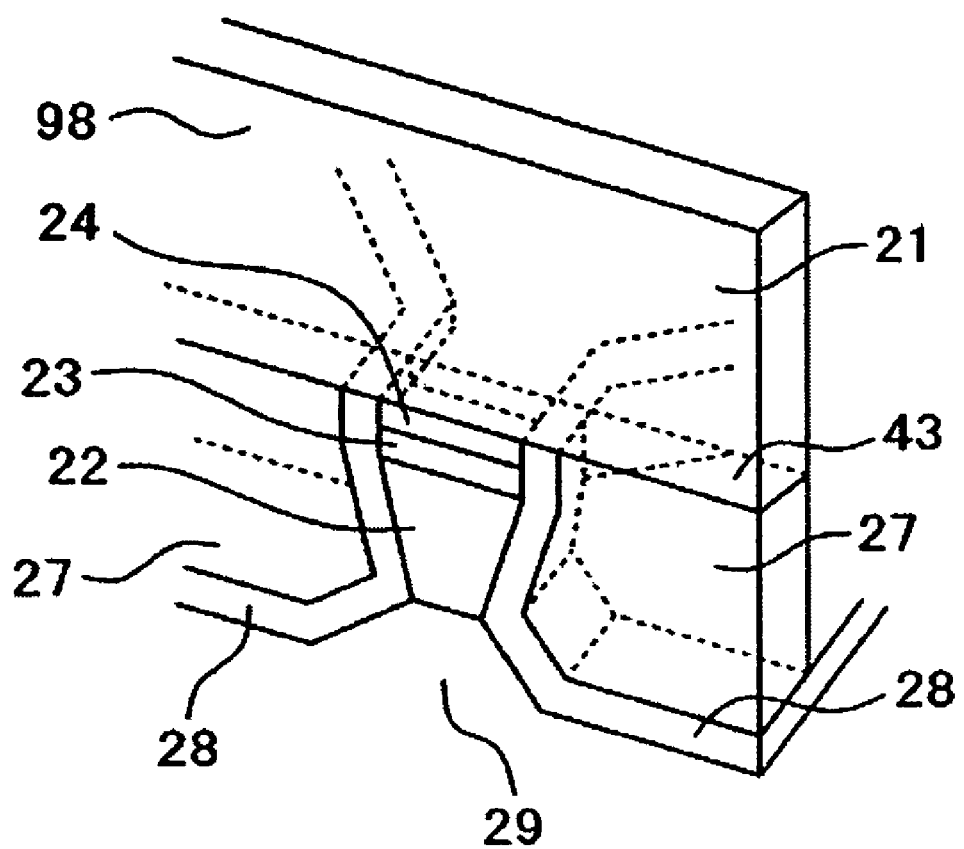
FIG. 2 is a perspective view of the writing functional portion of the magnetic head in embodiment 1.

FIG. 1 shows a structure in which a reading functional portion and a writing functional portion are stacked by way of a non-magnetic film above a substrate 10 of a slider. FIG. 1(a) is a cross-sectional view of a device, taken along the center of a main magnetic pole piece 22 and perpendicular to an air bearing surface 98, FIG. 1(b) is a view as viewed from the air bearing surface 98, and FIG. 1(c) is an enlarged view of the main magnetic pole piece 22 and the periphery thereof. FIG. 2 is a perspective view of the main magnetic pole piece 22 and the periphery thereof. As shown in FIGS. 1(a) and 1(b), the reading functional portion comprises a lower magnetic shield 11, an upper magnetic shield 12, and a magnetoresistive device 15 surrounded with the upper and lower magnetic shields and having a portion exposed to the air bearing surface. An electrode (not illustrated) is connected to the magnetoresistive device 15 and transmits electric information from the reading functional portion to the read/write circuit 6. The magnetoresistive device 15 uses a CPP (Current Perpendicular to Plane) device, a giant magnetoresistive effect (GMR) device, or the like. The upper and lower magnet shields 12, 11 each use the permalloy comprising NiFe with 80% or more of Ni. The slider 10 serving as the substrate in device forming step uses a ceramic material such as of $Al_2O_3$—TiC (ALTIC). The upper and lower magnetic shields 12, 11 and the magnetoresistive device 15 are separated, for example, by $Al_2O_3$ (alumina) or the like as a non-magnetic and insulative (or extremely high electric resistive) material.

The writing functional portion is basically composed of a magnetic film 22 constituting a main magnetic pole piece for writing to a magnetic disk 2, magnetic films 17 and 16 constituting an auxiliary magnetic pole piece for returning a magnetic flux from the magnetic disk 2 and coils 20 turning around a magnetic circuit constituted with the auxiliary magnetic pole piece and the main magnetic pole piece disposed therebetween. The magnetic film 17 is configured to be wide on the air bearing surface 98 and thin in the depth direction. This is for reducing unnecessary magnetic fields upon recording and decreasing the amount of protrusion to the air bearing surface at high temperatures.

The magnetic film constituting the magnetic pole piece for writing to the magnetic disk 2 is basically composed of a main magnetic pole piece 22 exposed to the air bearing surface and defining the recording track width, and a shield 21 disposed on the trailing side (on the outflow end side) of the main magnetic pole piece 22. The main magnetic pole piece 22 is connected at its rear end with a soft magnetic film 19 and constitutes a back gap at the rear end of the soft magnetic film 19. The soft magnetic film 19 is magnetically coupled by way of the soft magnetic film 18 with the rear end of the magnetic film 16 at the back gap portion.

Coils 20 are disposed between the soft magnetic film 19 and the magnetic film 16, and an insulative film 25 is disposed between the coils 20 and the magnetic film 16 so as to ensure electric insulation therebetween. Further, an insulator 26 is filled between the coils 20 and the soft magnetic film 19 to ensure electric insulation therebetween. The insulator 26 preferably uses alumina, which is the same material as that used for the portion below the main magnetic pole piece 22.

The constitution on the periphery of the main magnetic pole piece 22 will be described with reference to FIGS. 1(c) and 2. The main magnetic pole piece 22 is disposed on a filled film 29 comprising alumina as a non-magnetic insulator. A first non-magnetic film 23 is disposed on the trailing side of the main magnetic pole piece 22. Further, a soft magnetic film 24 is disposed in contact with the first non-magnetic film 23. A second non-magnetic film 28 is disposed on both sides of the main magnetic pole piece 22 and at least a portion thereof is in contact with the end of the first non-magnetic film 23. A second soft magnetic film 21 is disposed in contact with the first non-magnetic film 24. The second non-magnetic film 28 is in contact with a third soft magnetic film 27, and the third soft magnetic film 27 is magnetically coupled with the second soft magnetic film 21. The contact surface 43 is formed as a planar surface by chemical mechanical polishing (CMP).

The configuration of the first non-magnetic film 23 and the first soft magnetic film 24 will be described referring again to FIG. 1(*a*). As apparent from the figure, the depth-directional length of the first non-magnetic film 23 can be made the same as that of the first soft magnetic film 24. In particular, the rear ends of the first non-magnetic film 23 and the first soft magnetic film 24 may be coincident with that of the main magnetic pole piece 22. The advantage of the configuration will be described later.

With the configuration described above, a magnetic head of a narrow track width can be obtained at a high yield. First, since the first non-magnetic film 23 and the second non-magnetic film 28 are separate members, control for the magnetic distance can be separately achieved by selecting the thickness for each of the films. This facilitates the manufacture of a head capable of satisfying the aimed conditions of the shape.

Further, since the first non-magnetic film 23 and the second non-magnetic film 28 are separate members, a non-magnetic metal and a non-magnetic oxide can be selectively applied to the non-magnetic films 23, 28. Therefore, a film forming method at a reduced manufacturing cost can be selectively applied to the member that does not require the accuracy of the film thickness. According to the study made by the present inventors, the second non-magnetic film 28 can be manufactured by a plating method at a reduced cost because the accuracy of its thickness is not required.

The first soft magnetic film 24 is in magnetic contact with the second soft magnetic film 21 and functions as a shield. The shield is close to the main magnetic pole piece 22, which facilitates shunting of the magnetic flux from the main magnetic pole piece 22. This facilitates the flow of the magnetic flux from the trailing side of the main magnetic pole piece 22 by way of the shield to the recording medium. If it flows widely to the recording medium on the trailing side, the magnetic flux is weakened in view of the magnetic field strength, which gives no effects on the writing operation. The phenomenon of flowing the magnetic flux on the trailing side of the main magnetic pole piece 22 in a wide range causes an effect of making the magnetic field gradient on the trailing side abrupt. That is, by bringing a region not allowing the magnetic flux to flow to the shield on the trailing side of the main magnetic pole piece 22 and directly acting on the recording medium, closer to a region where the magnetic field is weakened by the shield, a great difference can be provided for the magnetic field strength depending on the position of the medium.

This effect can narrow the magnetization transition width and prevent the effect of giving unnecessary magnetic field to magnetization transition after recording (written before one bit). In order to effectively attain the effect, it is necessary to bring the main magnetic pole piece 22 and the shield closer to each other. It has been confirmed by the result of the computer simulation for the amount of approach that the distance may be from about 20 to 40 nm between the surface of the underlayer soft magnetic layer constituting a recording medium and the surface of the main magnetic pole piece constituting the air bearing surface. According to the configuration of embodiment 1, the distance can be controlled by the thickness of the first non-magnetic film 23. This facilitates manufacture of a head capable of satisfying the shape factor for attaining the high performance head.

On the other hand, a shield made of a soft magnetic film is necessary also for both sides of the main magnetic pole piece 22. The shield is provided so as not to apply unnecessary magnetic fields to adjacent tracks during recording operation. In order to attain the effect, the shield (third soft magnetic film) 27 may be disposed by way of non-magnetic film 28 with a thickness of about 100 nm from the main magnetic pole piece 22. In a case where the thickness of the non-magnetic film 28 was reduced to about 40 nm equal with that of the non-magnetic film 23 on the trailing side, the magnetic field intensity was greatly degraded and aimed recording operation could not be attained.

When the third non-magnetic film 27 is disposed on both sides of the main magnetic pole piece 22, the distance therebetween cannot be reduced. One reason is that the main magnetic pole piece 22 needs to be formed in a planar restricted shape toward the air bearing surface in order to generate strong magnetic fields. Another reason is that, if the distance between the main magnetic pole piece 22 and the third soft magnetic film 27 is narrowed, the magnetic flux flows from the restricted region to the third soft magnetic film 27 to lower the magnetic field strength. In a case where the magnetic field strength is weak, the magnetic information cannot be written to the recording medium. This is because the recording medium is designed so as to have a predetermined coercivity in order to provide a magnetic stability so that the magnetic information should not be erased by the stray magnetic fields. The information cannot be recorded unless magnetic fields greater than the coercivity are applied.

Since the distance between the main magnetic pole piece 22 and the first soft magnetic film 24 (and magnetically coupled second soft magnetic film 21) disposed thereabove is constant (film thickness of the first non-magnetic film 23) for the entire region, less effect is given on the magnetic field strength. Accordingly, it can be understood that the design factor is control for the film thicknesses of the non-magnetic layers being different between the left and right sides (a track width direction) and trailing side (medium outflow direction) of the main magnetic pole piece 22.

In embodiment 1, the description has been made of a combined magnetic head having a reading functional portion and a writing functional portion by way of example, but it will be apparent that the characteristic configuration on the periphery of the main magnetic pole piece is applicable to a magnetic head having only the writing functional portion.

EMBODIMENT 2

Figure 4:
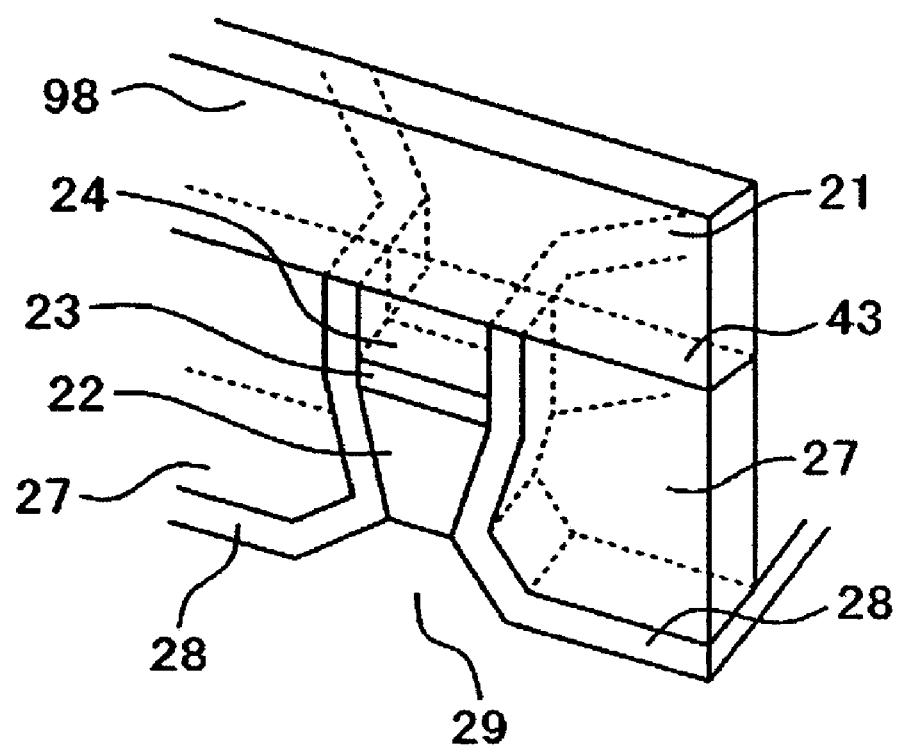
FIG. 4 is a perspective view of a writing functional portion of a magnetic head of embodiment 2.

As shown in FIG. 4, the configuration of increasing the thickness of the first soft magnetic film 24 also has an advantage in view of the manufacture intended in the invention. That is, as apparent from the figure, a first non-magnetic film 23 and a second non-magnetic film 28 are formed of separate members and the end face of the first non-magnetic film 23 and the surface of the second non-magnetic film 28 are in contact with each other. Accordingly, it has an advantage of easy manufacture in view of the control for the thicknesses of the non-magnetic films in the same manner as in embodiment 1. In addition, since the thickness of the first soft magnetic layer 24 is increased, advantageously the finish tolerance of the upper surface 43 of the first soft magnetic layer 24 can be easily extended upon CMP fabrication.

Figure 5:
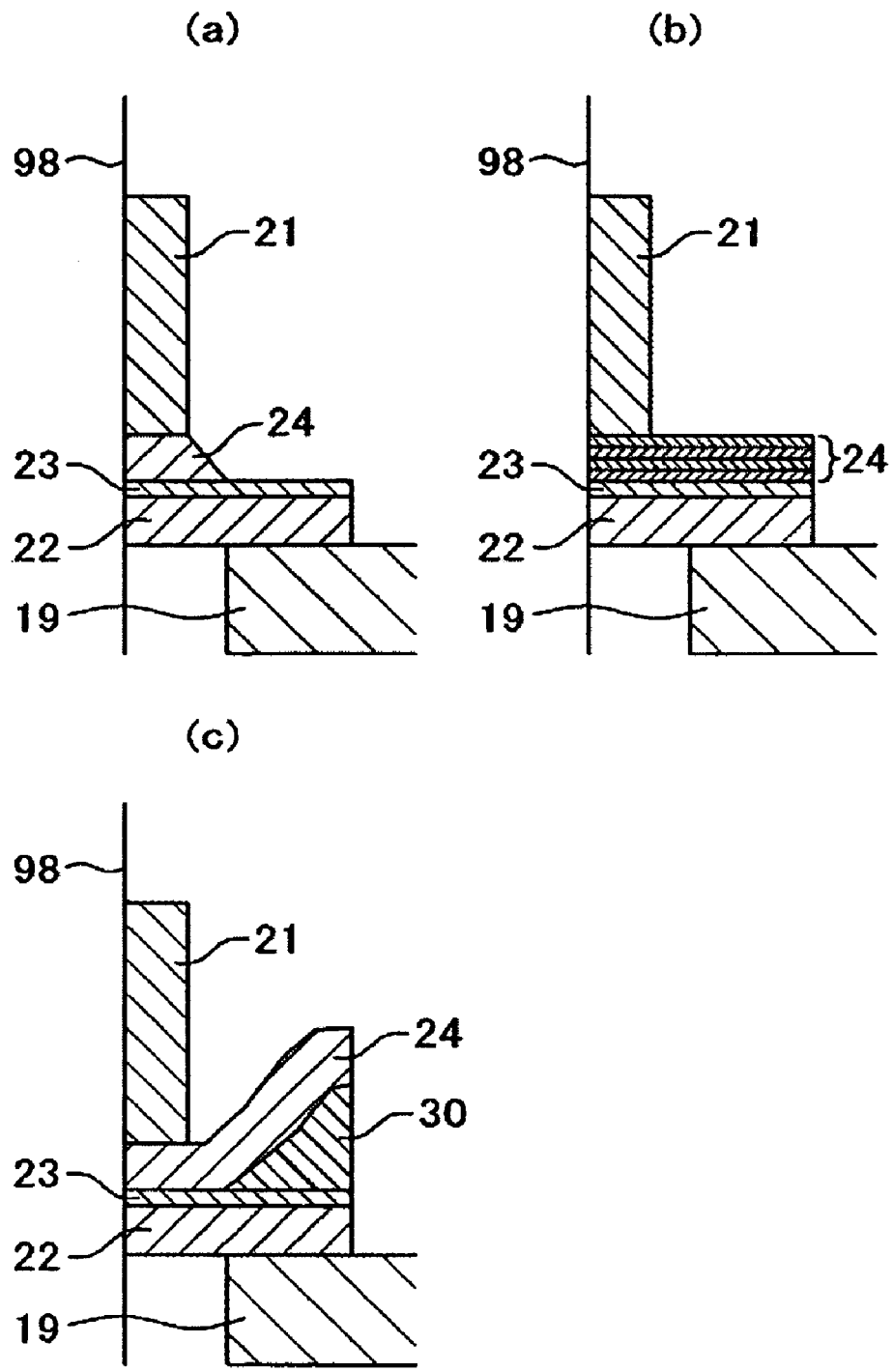
FIG. 5 is a cross-sectional view of the writing functional portion of the magnetic head of embodiment 2.

The increased thickness of the first soft magnetic film 24 described in this embodiment has a drawback of generating unnecessary magnetic fields on the side of the air bearing surface. FIG. 5 shows a structure of eliminating this drawback. FIGS. 5(*a*), 5(*b*) and 5(*c*) illustrate three types of structural examples, respectively. FIG. 5(a) shows a structure in which the rear end of the first soft magnetic film 24 is shortened. With the structure, since the total amount of magnetic flux flowing from the main magnetic pole piece 22 by way of the first non-magnetic film 23 to the first soft magnetic film 24 is reduced, the magnetic fields generated on the air bearing surface 98 can be weakened.

Further, as shown in FIG. 5(b), the first soft magnetic film 24 is formed as a multi-layered film comprising a soft magnetic film and a non-magnetic film such as one made of Cr, Ta or other materials, or alumina of low permeability (for example, a structure of stacking about 100 nm of soft magnetic film and 4 nm of Cr successively). This can reduce the total amount of the magnetic flux flowing in that portion.

Further, as shown in (c), a non-magnetic layer 30 is disposed below the rear of the first soft magnetic film 24 so as to increase a magnetic distance relative to the main magnetic pole piece 22. This can reduce the total amount of the magnetic flux flowing in the first soft magnetic film 24.

EMBODIMENT 3

Figure 6:
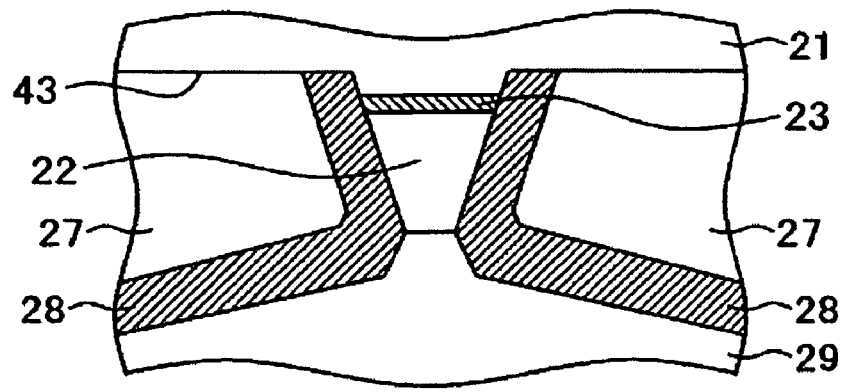
FIG. 6 is a side view of a writing functional portion of a magnetic head of embodiment 3 as viewed from an air bearing surface.

FIG. 6 shows a configuration of embodiment 3 saving the first soft magnetic film 24. According to the configuration, a stopper film (film for controlling a fabrication end point) can be disposed which is used when a planar surface 43 is formed above the first non-magnetic film 23. The stopper film can also be used as the first non-magnetic film 23. Since this involves a drawback tending to induce defects such as chipping to the edge portion, however, a stopper film such as one made of Rh or Ru, Cr, C, etc. is used in embodiment 3 by which fabrication can be finished with an aimed shape also for the track edge portion.

Further, it is also possible to leave the stopper film as a final structure. However, this gives rise to a problem of increasing the total thickness of the non-magnetic film and a problem of causing a requirement to adopt a countermeasure against corrosion since the stopper film remains on the air bearing surface. Accordingly, the stopper film is removed by a selective etching method before formation of the second soft magnetic film 21. The shield to the main magnetic pole piece 22 is formed by burying a recess caused by the treatment and forming the second soft magnetic film 21 in other regions.

EMBODIMENT 4

Figure 7:
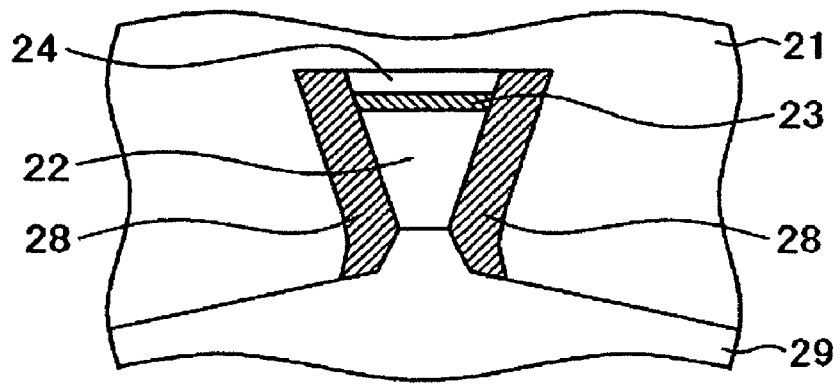
FIG. 7 is a side view of a writing functional portion of a magnetic head of embodiment 4 as viewed from an air bearing surface.

FIG. 7 shows the configuration of embodiment 4. This configuration includes a main magnetic pole piece 22, a first non-magnetic film 23, a first soft magnetic film 24, a second non-magnetic film 28 on both sides of the ends of the above members in contact therewith, and a second soft magnetic film 21 serving as a shield disposed on the periphery of the above members. This configuration does not have the third soft magnetic film 27. Also in this configuration, since the first non-magnetic film 23 and the second non-magnetic film 28 are separate members, the advantage in view of the manufacture is not deteriorated in that each of the film thicknesses can be controlled, and the performance of a magnetic head is not degraded.

The configuration is characterized by saving the CMP step. That is, after formation of the first soft magnetic film 24, the second non-magnetic film 28 are stacked over the entire surface thereof, the second non-magnetic film 28 is removed while leaving both sides of the main magnetic pole piece 22, and the second soft magnetic film 21 is formed. To satisfy the configuration, it is necessary to leave the second non-magnetic film 28 on both sides of the main magnetic pole piece 22.

Suitable examples of a method of meeting this necessity include a method of etching with ions in the perpendicular direction. Since the CMP step is saved, an easily chemically corrosive material can be advantageously used for members such as the main magnetic pole piece.

Further, to reliably finish the etching at a portion above the first non-magnetic film 23, a film such as one made of carbon may also be inserted into the same portion instead of the first soft magnetic film 24. Due to the high etching resistant, the carbon film can be removed easily with oxygen when it is no longer necessary after etching. This treatment makes it easy to keep short the magnetic gap length of the main magnetic pole piece 22 on the trailing side. Naturally, the carbon film can be left finally at the position for the first soft magnetic film (corresponding to 24) within a range of allowing the trailing side gap length.

EMBODIMENT 5

Figure 8:
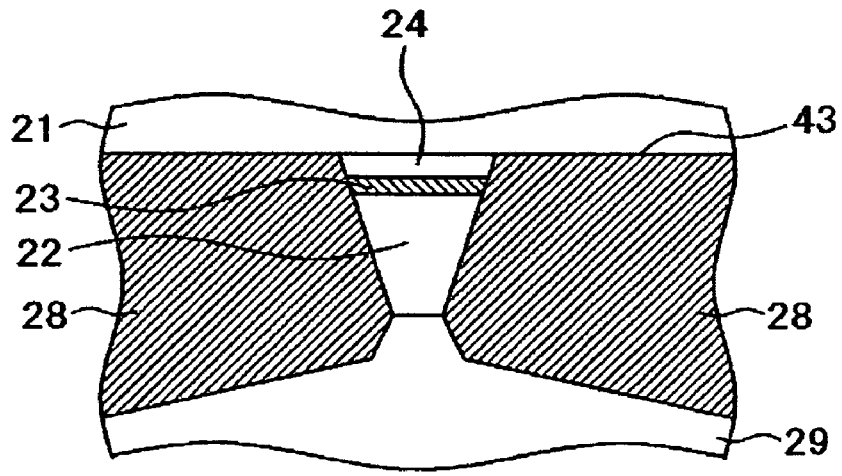
FIG. 8 is a side view of a writing functional portion of a magnetic head of embodiment 5 as viewed from an air bearing surface.

FIG. 8 shows a configuration in which the third soft magnetic film 27 is not present but the second non-magnetic film 28 is present extensibly on both sides of the main magnetic pole piece 22. Also in this configuration, since the first non-magnetic film 23 and the second non-magnetic film 28 are separate members, the advantage in view of the manufacture is not deteriorated in that each of the film thicknesses can be controlled. Although the configuration has an advantage capable of simplifying the manufacturing step according to the absence of the third soft magnetic film, disadvantageously recording magnetic fields leak to the adjacent tracks. However, the second soft magnetic film 21 as the shield is present by way of the first non-magnetic film 23 on the trailing side of the main magnetic pole piece 22, which provides a feature capable of making the magnetic field gradient on the trailing side abrupt. The feature makes it possible to provide high density recording in one identical track.

Figure 9:
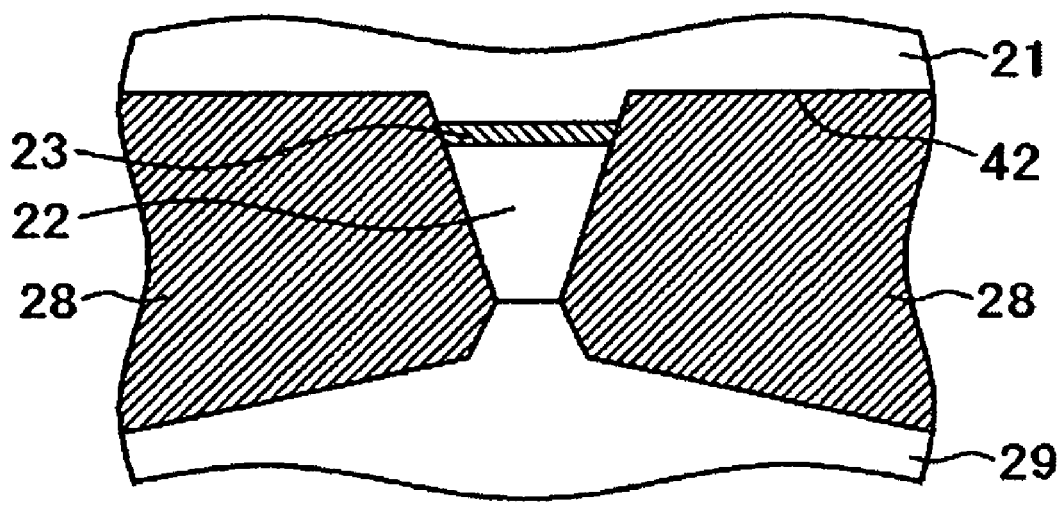
FIG. 9 is a side view of the writing functional portion of the magnetic head of embodiment 5 as viewed from the air bearing surface.

FIG. 9 shows a structure of forming the second soft magnetic film 21 after removal of the first soft magnetic film 24 in embodiment 5. The recording operation is the same as that in embodiment 5. The feature of the constitution is that the end point control film for forming the planar surface 42 by CMP is applicable to a portion where the first soft magnetic film 24 is removed.

Also in the configuration of embodiment 5 described above, since the first non-magnetic film 23 and the second non-magnetic film 28 are separate members, the advantage in view of the manufacture is not deteriorated in that each of the film thicknesses can be controlled. In addition, it is apparent that the performance of the magnetic head can be satisfied by providing the likelihood for the density in the adjacent direction.

Figure 10:
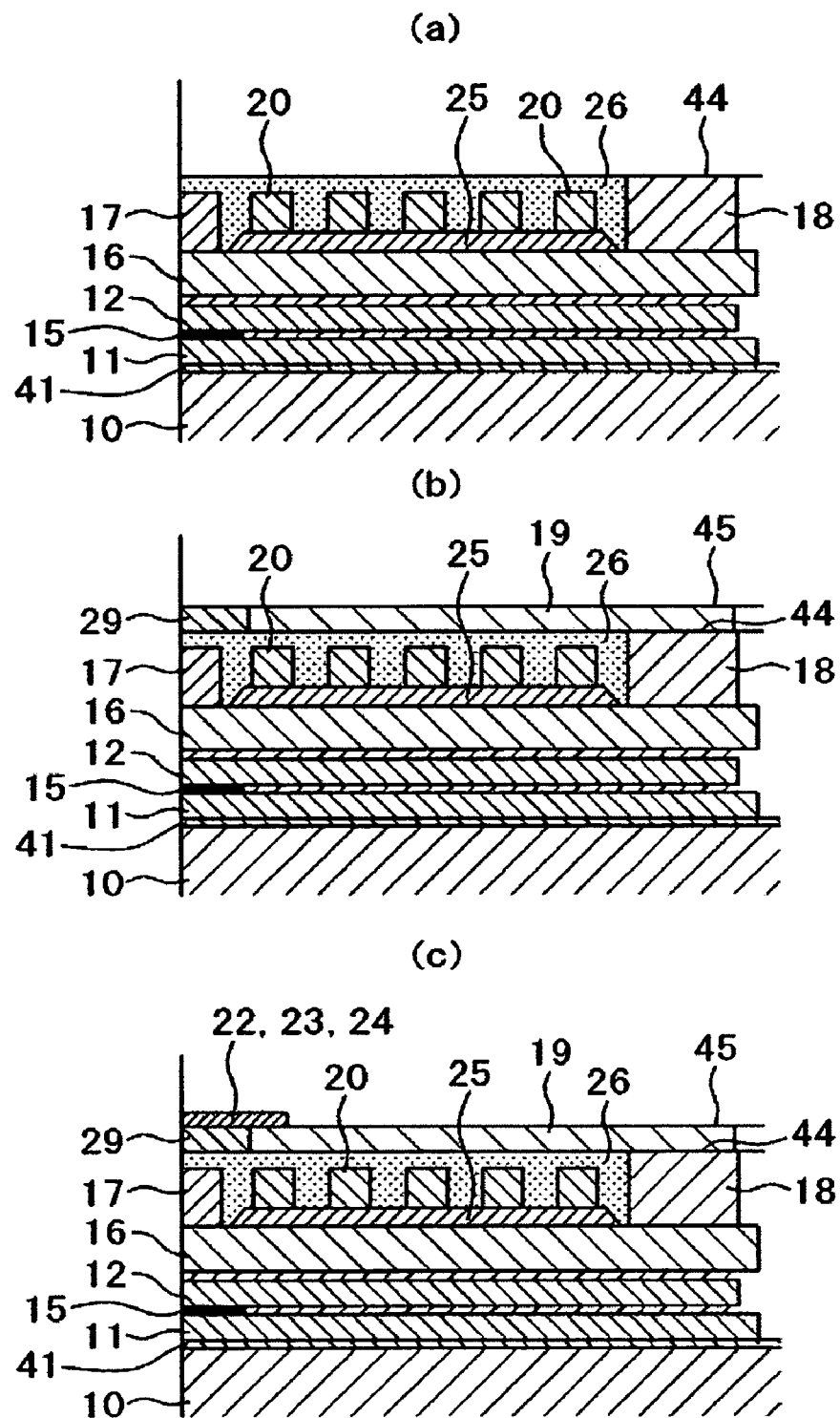
FIG. 10 includes cross-sectional views showing manufacturing steps for a basic configuration of the magnetic heads of embodiments 1 to 5.

A device manufacturing method for providing the basic structure of embodiments 1 to 5 will be described specifically with reference to FIG. 10.

(a) A non-magnetic film 41 comprising aluminum is formed on an ALTIC substrate 10 as a slider. A lower shield 11 comprising permalloy as a soft magnetic film is formed over them. A magnetoresistive device 15 insulated with a non-magnetic film is formed over the lower shield 11. An upper shield 12 comprising the same material as that of the lower shield 11 is formed thereover. A soft magnetic film 16 as an auxiliary magnetic pole piece is formed by way of a non-magnetic film over the upper shield 12. A pedestal-like soft magnetic film 17 is formed on the soft magnetic film 16 on the side of the air bearing surface. The pedestal-like soft magnetic film 17 has a large area exposed to the air bearing surface for decreasing the magnetic fields leaking from the auxiliary magnetic pole piece 16 and a large area portion with reduced thickness in order to reduce the problem in which the auxiliary magnetic pole piece 16 protrudes at high temperatures. Further, a soft magnetic film 18 constituting the back gap portion is formed at the rear end of the auxiliary magnetic pole piece 16. A thin alumina film 25 is formed over the auxiliary magnetic pole piece 16 and between the pedestal-like soft magnetic film 17 and the soft magnetic film 18, and coils 20 made of Cu are formed thereover. After formation of the coils 20, the entire portion is buried with a non-magnetic film 26 and a planar surface 44 is formed by CMP. In the process described above, the soft magnetic films are made of permalloy.

(b) A soft magnetic film 19 for connecting the main magnetic pole piece and the soft magnetic film 18 is formed on the planar surface 44 and, further, a non-magnetic film 29 made of alumina is buried on the air bearing surface side of the soft magnetic film 19 and then a planar surface 45 is formed by CMP again.

(c) On the planar surface 45, a main magnetic pole piece 22, a first non-magnetic film 23, and a first soft magnetic film 24 are formed continuously.

Figure 11:
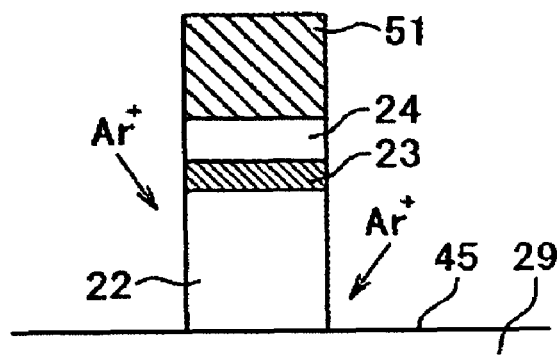
FIG. 11 includes views showing manufacturing steps of the writing functional portion of the magnetic heads of embodiments 1 and 3.
Figure 11:
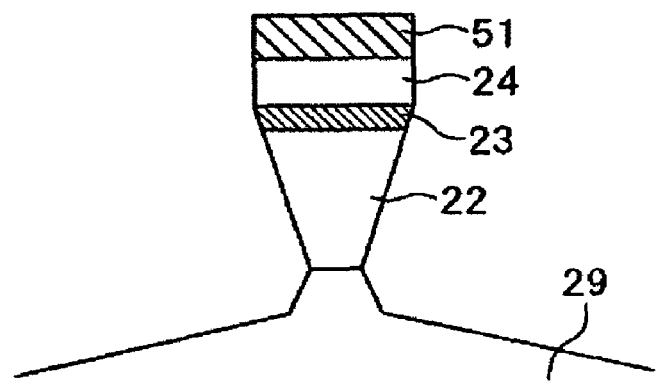
Figure 11:
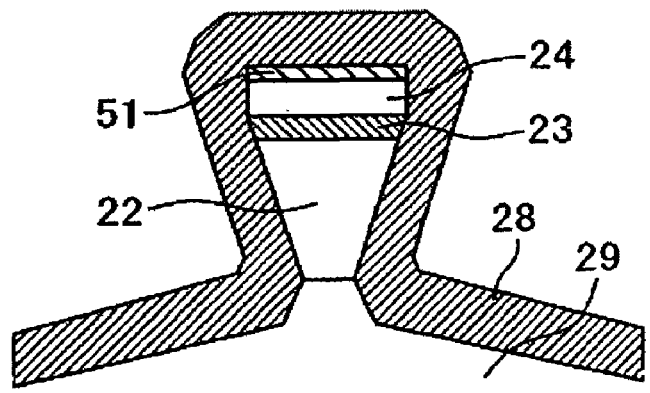
Figure 12:
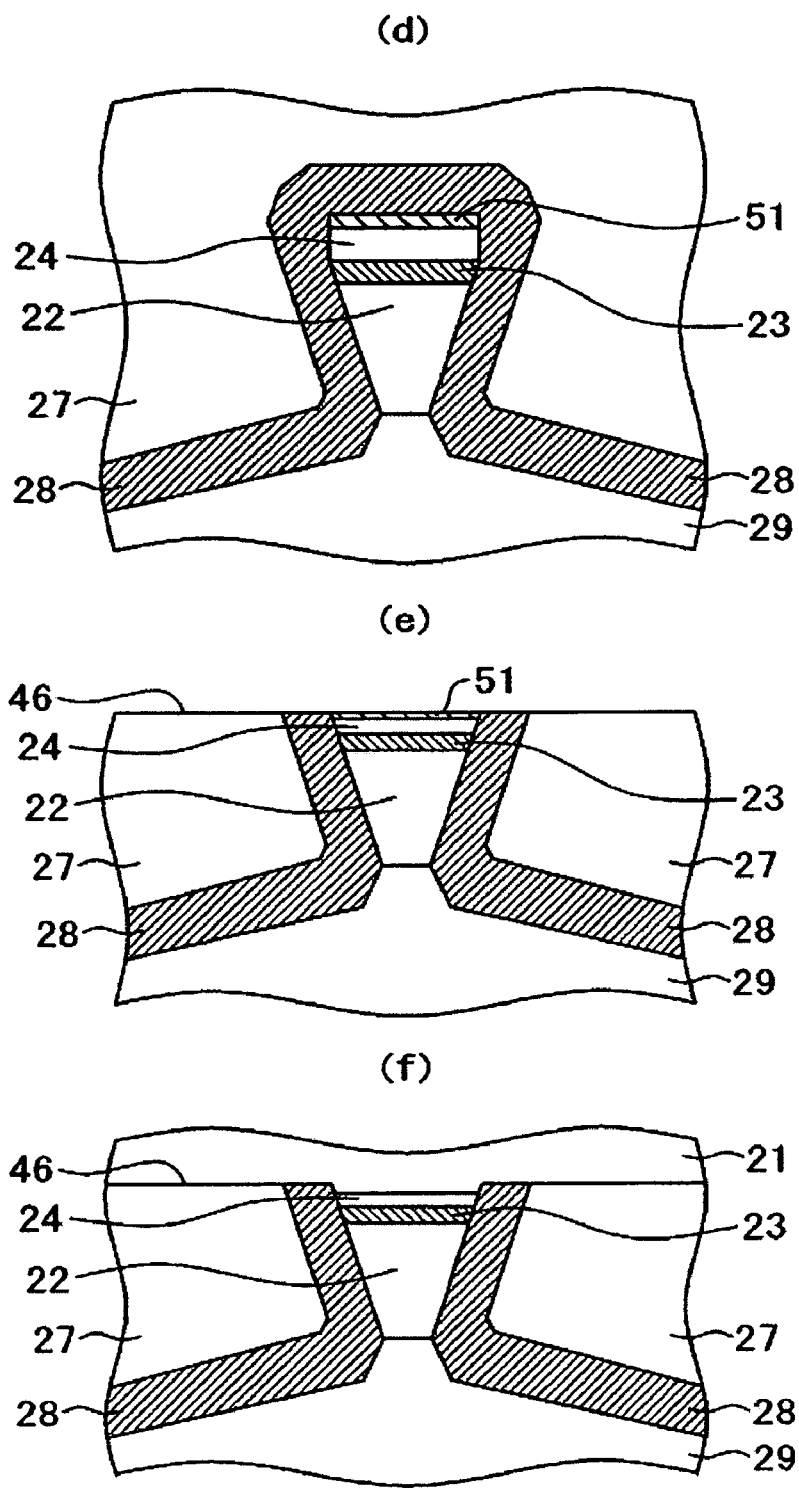
FIG. 12 includes views showing manufacturing steps of the writing functional portion of the magnetic heads of embodiments 1 and 3.

A method of forming the main magnetic pole piece and the periphery thereof in embodiments 1 and 3 will be described with reference to FIGS. 11 and 12. FIG. 11(a) is a side view, as viewed from the air bearing surface, illustrating the state where the magnetic film 22 as a main magnetic pole piece, the first non-magnetic film 23, and the first soft magnetic film 24 are continuously formed on the planar surface 45 of the non-magnetic film 29 and patterned. The rectangular shape can be formed by forming an etching mask pattern 51 on the stacked body and applying ion milling with Ar ions to the stacked body using the mask pattern 51 as a mask. By emitting ions in the perpendicular direction by ion milling, the cross section has a rectangular shape shown in the figure. Then, by slanting the ion incident angle obliquely, the main magnetic pole piece 22 of an inverted trapezoidal shape can be formed as shown in FIG. 10(b). In this case, the thickness of the mask pattern 51 is decreased. Subsequently, as shown in FIG. 10(c), a second non-magnetic film 28 is formed. A metal film is also applicable to the non-magnetic film 28 so long as it is non-magnetic. This metal film is formed of Au and to a thickness of about 100 nm by a plating method in the embodiments. The metal film has an advantage of facilitating the subsequent fabrication. The first non-magnetic film 23 uses an oxide film comprising alumina or silicon oxide as a main ingredient.

Successively, as shown in FIG. 12(d), a permalloy film 27 as a third soft magnetic film is stacked over the entire surface. Then, as shown in FIG. 12(e) a planar surface 46 is formed by CMP. The mask material 51 left in the ion milling treatment for the main magnetic pole 22 is used also for the control of fabrication end point. Subsequently, the mask material 51 is removed by oxygen to form a second soft magnetic film 21, which provides the configuration of FIG. 12(f).

The forming method described above can provide the following configuration. A gap film comprising the first non-magnetic film 23 is formed on the trailing side of the main magnetic pole piece 22. The second non-magnetic layer 28 is formed on both sides of the main magnetic pole piece 22. The end face of the first non-magnetic layer 23 is in contact with the surface of the second non-magnetic layer 28 and the second soft magnetic film 21 is formed on the trailing side in contact with the first soft magnetic film 24 and the third soft magnetic film 27. Since the first magnetic film 23 and the second soft magnetic film 28 can be formed by separate steps, the thickness of the first non-magnetic film 23 can be decreased compared with that of the second non-magnetic film 28. Moreover, the first non-magnetic film 23 and the second non-magnetic film 28 can be formed of different non-magnetic materials. Further, the first non-magnetic film 23 can be formed over the entire area of the main magnetic pole piece 22.

Figure 13:
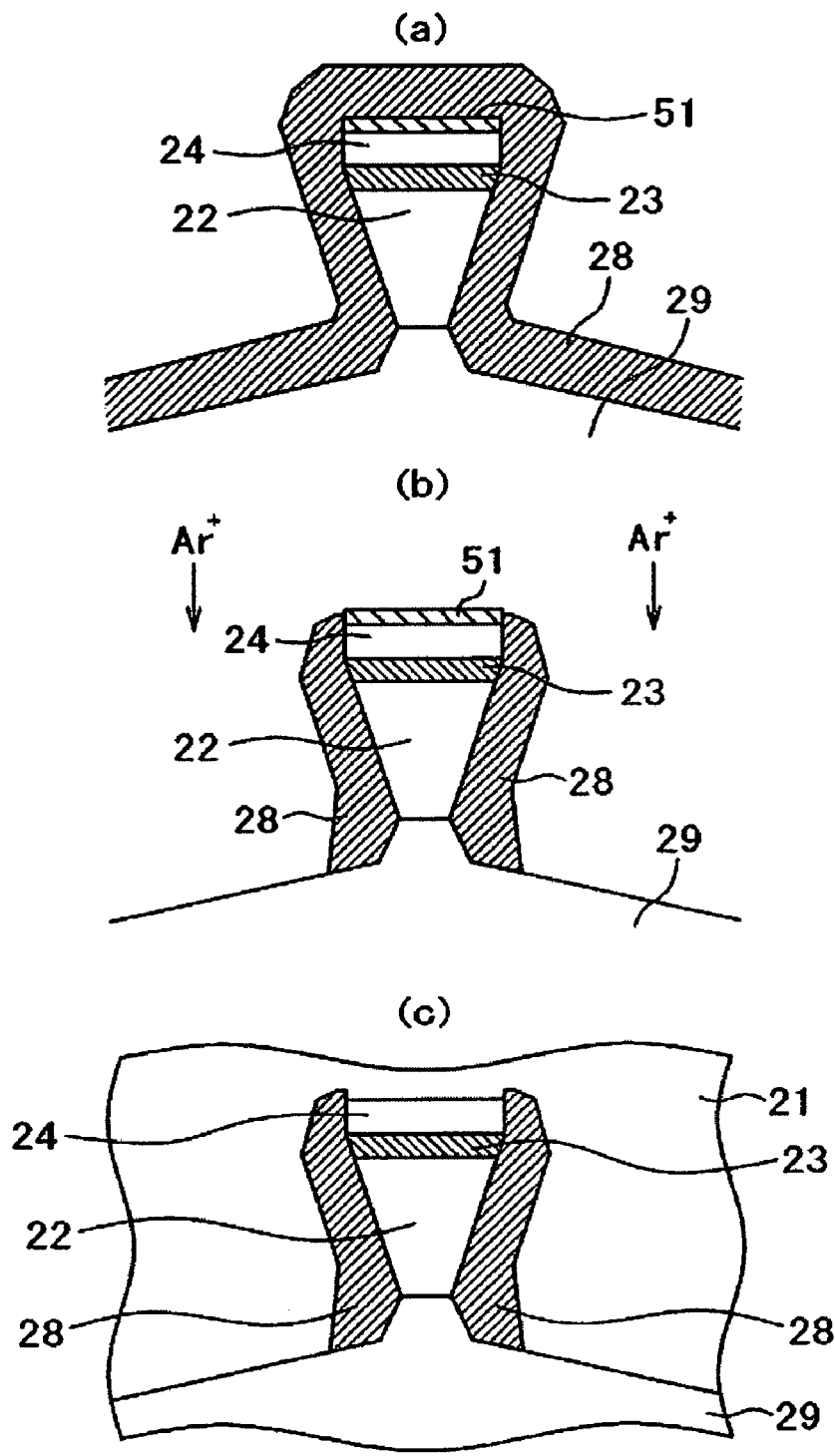
FIG. 13 includes views showing manufacturing steps of a writing functional portion of a magnetic head of embodiment 4.

A device forming step for providing the configuration in embodiment 4 (FIG. 7) will be described with reference to FIG. 13. FIG. 13(a) shows a state where the first non-magnetic film 23 and the first soft magnetic film 24 are formed on the main magnetic pole piece 22, further, a mask material 51 is formed further thereover, ion milling is applied thereto and, the second non-magnetic film 28 comprising a metal film Au is formed thereover. The steps preceding the state above are the same as the forming steps for providing the configuration of embodiments 1 and 3.

FIG. 13(b) shows a state of emitting ions in a perpendicular direction and removing the planar portion of the second non-magnetic film 28. The perpendicular ion milling can leave the second non-magnetic film 28 on both sides of the main magnetic pole piece 22 with an increased film thickness. Etching is conducted until the surface of the mask material 51 is exposed. Then, the mask material 51 is removed and the second soft magnetic film 21 is formed as shown in FIG. 13(c), which provides the aimed configuration.

The forming method described above can also provide the following configuration. The first non-magnetic film 23 is formed on the trailing side of the main magnetic pole piece 22 and the second non-magnetic layer 28 is formed on both sides of the main magnetic pole piece 22. The end face of the first non-magnetic layer 23 is in contact with the surface of the second non-magnetic layer 28 and the second soft magnetic film 21 is formed on the trailing side and the both sides in contact with the first soft magnetic film 24 and the second non-magnetic film 28. Since the first magnetic film 23 and the second soft magnetic film 28 can be formed by separate steps, the thickness of the first non-magnetic film 23 can be decreased compared with that of the second non-magnetic film 28. Further, the first non-magnetic film 23 and the second non-magnetic film 28 can be formed of different non-magnetic materials. In addition, the first non-magnetic film 23 can be formed over the entire area of the main magnetic pole piece 22.

Figure 14:
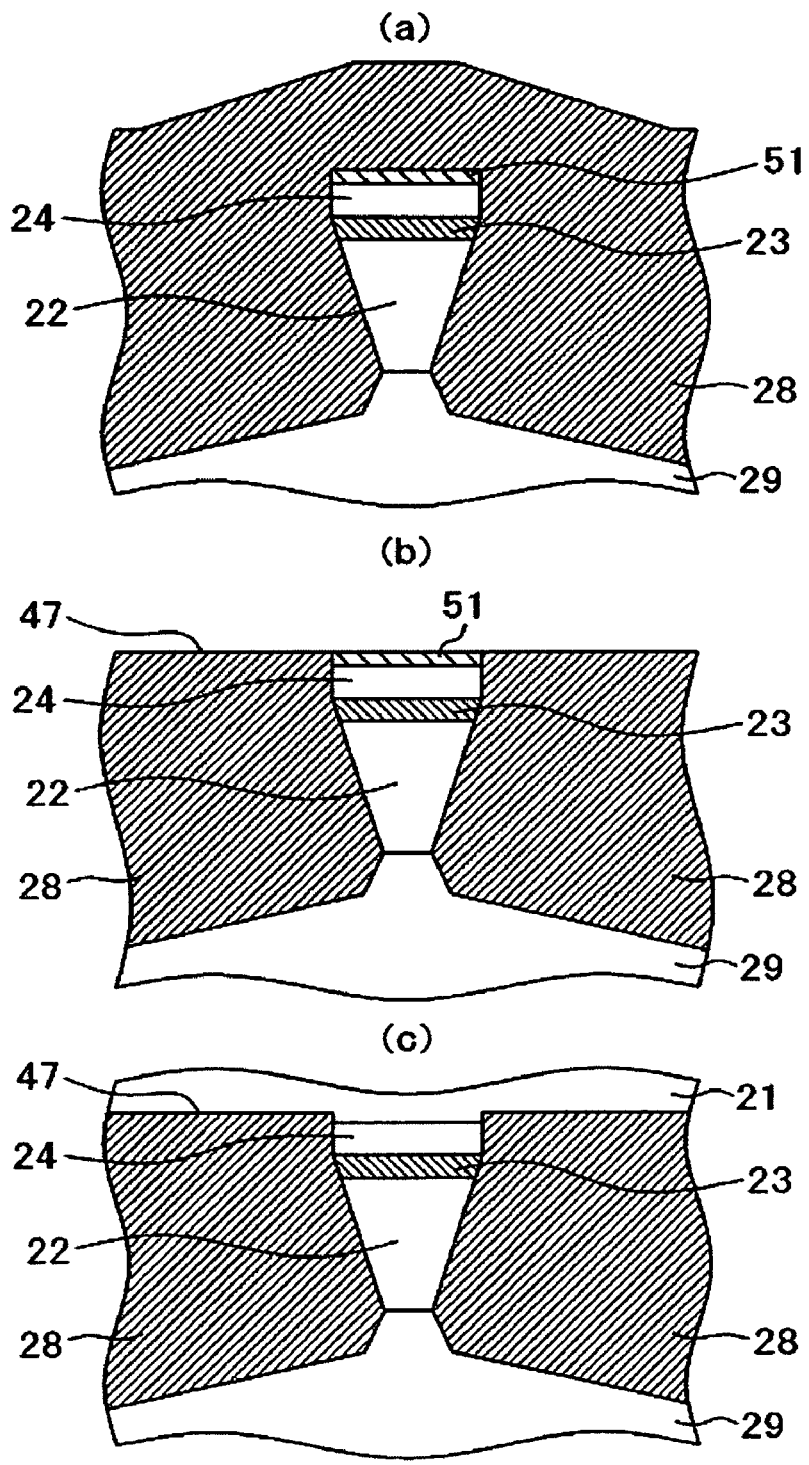
FIG. 14 includes views showing manufacturing steps of a writing functional portion of a magnetic head of embodiment 5.

A device forming step for providing the configuration in embodiment 5 (FIG. 8) will be described with reference to FIG. 14. FIG. 14(a) shows the state starting from the step of forming the second non-magnetic film 28 over the entire surface after the step in FIG. 11(b). Then, as shown in FIG. 14(b), a planar surface 47 is formed by CMP. The fabrication end point in this case is at the mask material 51 formed of carbon. Then, the mask material 51 is removed by an oxidizing treatment and the second soft magnetic film 21 is formed thereover, which provides the configuration in FIG. 14(c).

Also in this forming method, since the first non-magnetic film 23 and the second non-magnetic film 28 are separate members, the advantage in view of the manufacture is not deteriorated in that the each of the film thicknesses can be controlled. The forming method has an advantage capable of simplifying the manufacturing step according to the absence of the third soft magnetic film.

Figure 15:
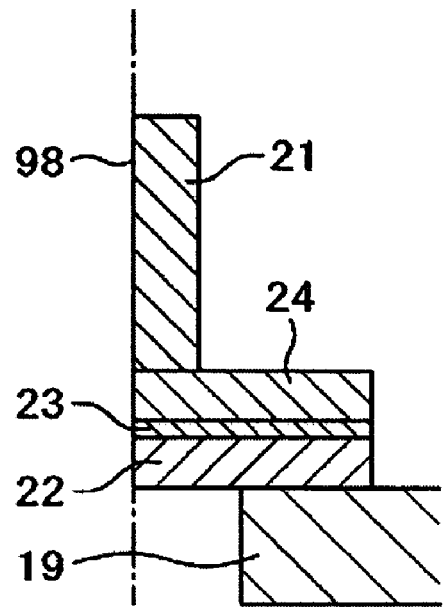
FIG. 15 includes cross-sectional views for describing the method of manufacturing the magnetic head writing functional portion of embodiment 2.
Figure 15:
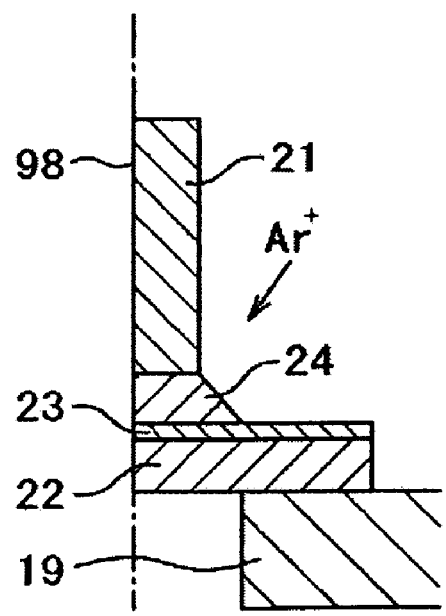
Figure 1:
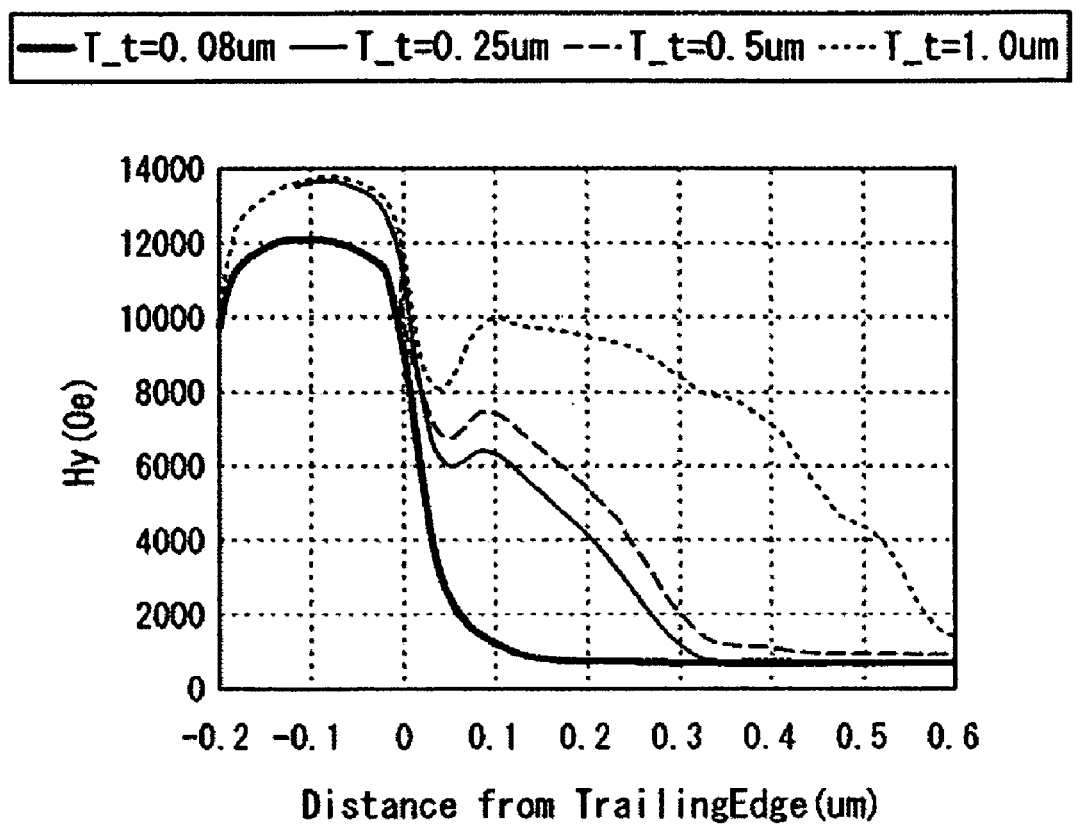

A method of shortening the length of the first soft magnetic film 24 in the direction of the depth in embodiment 2 will be described with reference to FIG. 15. FIG. 15(a) shows a basic structure. The main magnetic pole 22 is formed to connect with the soft magnetic film 19. The first non-magnetic film 23 and the first soft magnetic film 24 are successively stacked on the main magnetic pole piece 22. The length in the direction of the depth of the first soft magnetic film 24 is equal with that of the depth of the main magnetic pole piece 22. The first soft magnetic film 24 is further coupled magnetically with the second soft magnetic film 21. What is important in this constitution is that the length of the second soft magnetic film 21 in the direction of the depth is shorter compared with that of the first soft magnetic film 24 in the direction of the depth. In a case where the length of the soft magnetic film 21 in the direction of the depth is longer, a great amount of magnetic flux flows from the main magnetic pole piece 22 by way of the first soft magnetic film 24 to the second soft magnetic film 21 and, as a result, this greatly lowers the magnetic fields generated from the main magnetic pole piece 22. Accordingly, aimed recording operation cannot be attained.

Further, the thickness of the first soft magnetic film 24 is also important. In a case where the thickness is large, a great amount of leaking magnetic fields are generated from the air bearing surface 98 thereof and aimed recording operation cannot be attained. However, it was confirmed that this phenomenon can be reduced by making the length of the second soft magnetic film 21 in the direction of the depth longer. Details are to be described later. Further, the thickness of the first soft magnetic layer 24 also depends on the length in the direction of the depth thereof.

As shown in FIG. 15(b), after formation of the second soft magnetic film 21, when the exposed portion of the first soft magnetic film 24 is selectively removed by an ion milling method or the like using the rear end edge of the film 21 as a mask, the length of the first soft magnetic film 24 can be shortened. With the configuration, the area of the opposed portion to the main magnetic pole piece 22 can be decreased to decrease the amount of magnetic flux flowing from the main magnetic pole piece 22 to the first soft magnetic film 24. In this case, by using an alumina film of high ion milling resistance for the first non-magnetic film 23, the surface of the main magnetic pole piece 22 can be protected against etching.

A description will be made of a case where the thickness of the first soft magnetic film 24 has an optimal value (allowable range) when the length of the first soft magnetic film 24 is made equal with the length of the magnetic pole piece 22. FIG. 16 shows the result of calculation for the magnetic fields of the main magnetic pole piece 22 when the thickness of the first soft magnetic film 24 in contact with the first non-magnetic film 23 is changed within a range from 80 nm to 1 μm in a case where the thickness of the first non-magnetic film 23 is 60 nm. Other main conditions for the calculation of magnetic fields are as below. A track width of the main magnetic pole piece 22 is 0.12 μm, the angle of the inversed trapezoidal shape is 8°, the flare point length (the length of a region having a width equal with the track width) is 120 nm, the thickness of the main magnetic pole piece is 200 nm, and the thickness of the second non-magnetic film 28 on both sides of the main magnetic pole piece 22 is about 180 nm. The magnetomotive force is 0.15 AT, the distance between the medium underlayer soft magnetic layer and the surface of the main magnetic pole piece is 37.3 nm, and the distance to the center of the recording layer is 19.3 nm. The saturation magnetic flux density of the first soft magnetic film 24 is 1.0 T and the saturation magnetic flux density of the soft magnetic film 21 is 2 T. The length of the second soft magnetic film 21 in the direction of the depth is 0.3 μm.

The result of calculation in FIG. 16 is to be noted. T_t shown in FIG. 16 represents the condition for the thickness of the first soft magnetic layer 24. Taking notes of the result, a strong magnetic field of 12 KOe (960 KA/m) or more is obtained from the main magnetic pole piece 22, as a matter to be noted, and it can be seen that as the thickness of T_t decreases, that is, by setting the thickness of the first soft magnetic film 24 to 80 nm, unnecessary magnetic fields on the side of the flow-out end is decreased.

Unnecessary magnetic fields may be stronger than the magnetic field at the recording point. This causes erroneous operation in which the information written by the main magnetic pole piece is erased at the leaking portion. However, under the condition where the film thickness of the first soft magnetic film 24 is 80 nm shown in FIG. 16, a magnetic field distribution equivalent to the absence of the first soft magnetic film 24 is obtained. The state can be obtained for all the range where the thickness of the first soft magnetic film 24 is set to 80 nm or less.

Further, it can be seen that another effect can be obtained from the foregoing result. That is, in this calculation, the length of the second soft magnetic layer 21 in the direction of the depth is set to 0.3 μm. It is disclosed so far in the patent documents described above, etc. that the length in the direction of the depth should be substantially equal with the distance between the medium underlayer soft magnetic layer and the surface of the main magnetic pole piece. However, in this embodiment, a length of 0.3 μm of the second soft magnetic film 21 in the direction of the depth is substantially longer than the distance of 37.3 nm between the medium underlying soft magnetic layer and the surface of the main magnetic pole piece. It will be understood easily that the effect capable of increasing the length can provide an effect of extending the manufacturing tolerance of the second soft magnetic film 21 in the direction of the depth.

It is probable that the reason that the length of the second soft magnetic film 21 in the direction of the depth can be increased is due to the presence of the first magnetic film 24 as far as the rear end in the same manner as that of the main magnetic pole 22. If the first soft magnetic film 24 is absent as in the existent structure, when the length of the second soft magnetic film 21 in the direction of the depth is increased, the amount of the magnetic flux absorbed therein is increased to result in a problem of lowering the recording magnetic field. However, in the structure of the embodiment, a great amount of magnetic flux is supplied from the first soft magnetic film 24 to the second soft magnetic film 21. Therefore, the portion tends to be saturated and, as a result, the magnetic field leaking from the main magnetic pole piece 22 is less absorbed. It is probable that the effect is that lowering of the magnetic field can be suppressed even when the length of the second soft magnetic film 21 in the direction of the depth is increased.

In view of the reason described above, it was confirmed a trend capable of setting the length of the second soft magnetic film 21 longer in the direction of the depth as the thickness of the first soft magnetic film 24 to be left is larger. As a result of various calculations, the present inventors have confirmed that an equivalent magnetic field distribution is obtained by increasing the distance as far as the rear and of the second soft magnetic film 21 by about 4 times compared with the absence of the first soft magnetic film 24.

As has been described already, the effect capable of increasing the distance as far as the rear end of the trailing shield (second soft magnetic film 21) is that accuracy in the manufacturing step can be increased. In the conventional constitution of no first soft magnetic film 24, while it has to be kept to about 40 nm, the distance can be increased as far as about 160 nm in the configuration of the embodiments described above. It will be understood easily that, if the tolerance in each step is 10%, the physical range of tolerance is more extended in this configuration than in the conventional configuration, and the manufacture is simplified.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A perpendicular recording magnetic head comprising:
an auxiliary magnetic pole piece;
a main magnetic pole piece;
a coil turning around a magnetic circuit comprising the auxiliary magnetic pole piece and the main magnetic pole piece;
a first non-magnetic film and a soft magnetic film stacked on a trailing side of the main magnetic pole piece; and
a second non-magnetic film formed on and in contact with both sides, in a track width direction, of the main magnetic pole piece, the first non-magnetic film, and the soft magnetic film.

2. The perpendicular recording magnetic head according to claim 1, wherein a thickness of the first non-magnetic film is less than a thickness of the second non-magnetic film.

3. The perpendicular recording magnetic head according to claim 2, wherein the thickness of the first non-magnetic film is from about 20 to 100 nm and the thickness of the second non-magnetic film is from about 40 to 180 nm.

4. The perpendicular recording magnetic head according to claim 1, wherein the first non-magnetic film and the second non-magnetic film are formed from different non-magnetic materials.

5. The perpendicular recording magnetic head according to claim 4, wherein the first non-magnetic film is an oxide film comprising alumina or silicon oxide as a main ingredient, and the second non-magnetic film is a metal film.

6. The perpendicular recording magnetic head according to claim 1, wherein the first non-magnetic film is disposed over the entire region of the main magnetic pole piece.

7. The perpendicular recording magnetic head according to claim 1, wherein the soft magnetic film includes a first soft magnetic film stacked above the first non-magnetic film and brought into contact with the second non-magnetic layer and a second soft magnetic film stacked above the first soft magnetic film and having a depth shorter than a depth of the first soft magnetic film.

8. The perpendicular recording magnetic head according to claim 7, wherein a length of the second soft magnetic film in the direction of the depth is longer than a distance between a surface of the soft magnetic underlayer constituting a portion of a recording medium and a surface of the main magnetic pole piece constituting an air bearing surface.

9. The perpendicular recording magnetic head according to claim 7, wherein the first non-magnetic film and the first soft magnetic film are disposed over the entire surface of the main magnetic pole piece, and the second soft magnetic film is disposed in contact with a portion of the first soft magnetic film.

10. The perpendicular recording magnetic head according to claim 7, wherein a width of the second soft magnetic film in the direction of the track width is larger than a width of the first soft magnetic film.

11. The perpendicular recording magnetic head according to claim 7, further comprising a third soft magnetic film provided on both sides of the main magnetic pole piece and on both sides of the second non-magnetic film, in the track width direction.

12. The perpendicular recording magnetic head according to claim 11, wherein the second soft magnetic film and the third soft magnetic film are in contact with each other via a planar surface.

13. The perpendicular recording magnetic head according to claim 1, further comprising a read functional portion adjacent to the auxiliary magnetic pole piece.

14. The perpendicular recording magnetic head according to claim 13, wherein the reading functional portion includes a lower magnetic shield, an upper magnetic shield, and a magnetoresistive device disposed via an insulative film between the upper and lower magnetic shield.

* * * * *